(12) United States Patent
Fort

(10) Patent No.: US 7,651,053 B2
(45) Date of Patent: Jan. 26, 2010

(54) AERODYNAMIC AIRFLOW DEFLECTOR FOR AIRCRAFT LANDING GEAR

(75) Inventor: Frederic Fort, St. Genies Bellevue (FR)

(73) Assignee: Airbus France, Toulouse (FR)

( * ) Notice: Subject to any disclaimer, the term of this patent is extended or adjusted under 35 U.S.C. 154(b) by 558 days.

(21) Appl. No.: 11/110,174

(22) Filed: Apr. 20, 2005

(65) Prior Publication Data

US 2006/0032981 A1    Feb. 16, 2006

(30) Foreign Application Priority Data

Apr. 20, 2004    (FR) .................................. 04 50739

(51) Int. Cl.
    *B64C 25/16*    (2006.01)
(52) U.S. Cl. .............................. 244/129.4; 244/102 R; 244/130
(58) Field of Classification Search ................. 244/130, 244/102 A, 102 R, 100 R, 1 N, 1 R, 129.4
    See application file for complete search history.

(56) References Cited

U.S. PATENT DOCUMENTS

| | | | | | |
|---|---|---|---|---|---|
| 1,881,073 | A | * | 10/1932 | Freeman ................. | 244/103 R |
| 1,887,738 | A | * | 11/1932 | Smith ..................... | 244/103 R |
| 2,129,824 | A | * | 9/1938 | De Seversky ........... | 244/102 R |
| 2,176,461 | A | * | 10/1939 | Larsen ................... | 244/102 R |
| 2,180,462 | A | * | 11/1939 | De Seversky ........... | 244/102 R |
| 2,406,710 | A | * | 8/1946 | Ramey et al. ........... | 244/102 R |
| 2,432,408 | A | * | 12/1947 | Glasgow et al. ........ | 244/102 R |
| 2,548,832 | A | * | 4/1951 | Tydon ...................... | 244/101 |
| 2,747,817 | A | * | 5/1956 | Saulnier ................. | 244/50 |
| 3,485,465 | A | * | 12/1969 | Churchill ................ | 244/102 R |
| 4,027,836 | A | * | 6/1977 | Seibel .................... | 244/103 R |
| 4,408,736 | A | * | 10/1983 | Kirschbaum et al. .... | 244/100 R |
| 4,479,622 | A | * | 10/1984 | Howse .................... | 244/129.5 |
| 5,058,827 | A | * | 10/1991 | Dansereau et al. ...... | 244/103 R |
| 6,352,221 | B1 | * | 3/2002 | Sakurai .................. | 244/102 R |
| 6,619,587 | B1 | | 9/2003 | Chow et al. | |
| 6,786,451 | B2 | * | 9/2004 | Courtois et al. ......... | 244/102 R |
| 7,243,880 | B2 | * | 7/2007 | White et al. ............ | 244/129.5 |
| 7,287,726 | B2 | * | 10/2007 | Briancourt .............. | 244/102 R |
| 2003/0102406 | A1 | * | 6/2003 | Chow et al. ............. | 244/100 R |
| 2003/0164423 | A1 | * | 9/2003 | Courtois et al. ......... | 244/102 R |
| 2005/0194496 | A1 | * | 9/2005 | White .................... | 244/129.4 |
| 2005/0230549 | A1 | * | 10/2005 | White et al. ............ | 244/129.4 |
| 2006/0060707 | A1 | * | 3/2006 | Chow et al. ............. | 244/129.4 |

(Continued)

FOREIGN PATENT DOCUMENTS

GB    756111    8/1956

(Continued)

*Primary Examiner*—Michael Carone
*Assistant Examiner*—Benjamin P Lee
(74) *Attorney, Agent, or Firm*—Patterson, Thuente, Skaar & Christensen, P.A.

(57) ABSTRACT

An aerodynamic airflow deflecting device for a landing gear retracting into a housing of an aircraft, comprising at least one element for closing the housing that is, through the action of a control device, able to occupy a position for shielding at least a part of the landing gear against the aerodynamic airflow, thus constituting a noise reducing aerodynamic device. The closing element can in particular include at least one trap door element that is, through the action of the control device, movable between a first position for closing the housing, a second position allowing the landing gear to exit and a third position constituting said shielding position.

5 Claims, 5 Drawing Sheets

U.S. PATENT DOCUMENTS

2006/0102775 A1 * 5/2006 Chow et al. .................. 244/1 N
2006/0157621 A1 * 7/2006 Santos Rubio et al. ... 244/129.4
2006/0226286 A1 * 10/2006 Hawkins .................. 244/102 R
2007/0108344 A1 * 5/2007 Wood ..................... 244/102 R

FOREIGN PATENT DOCUMENTS

WO  WO 04/000502 A1  12/2003

* cited by examiner

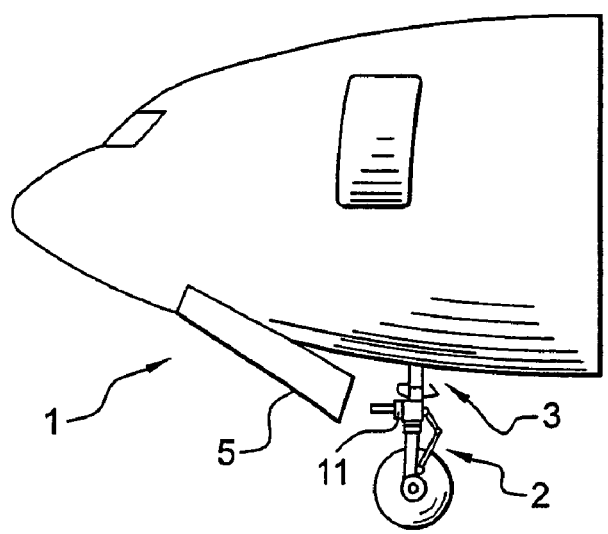
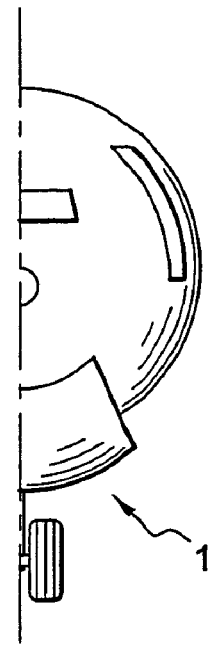
Fig. 6a  Fig. 6b
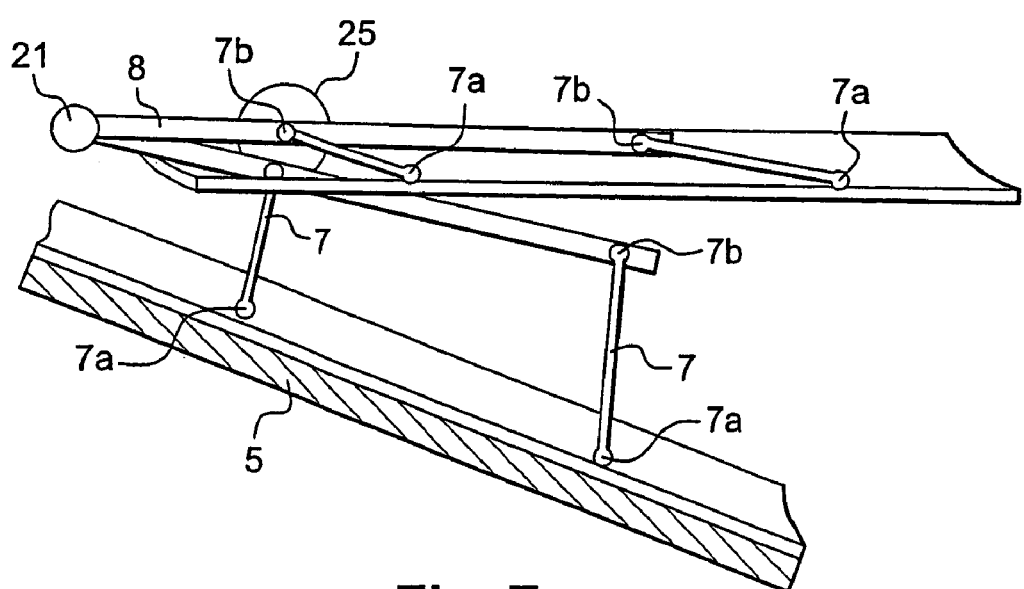
Fig. 7

AERODYNAMIC AIRFLOW DEFLECTOR FOR AIRCRAFT LANDING GEAR

RELATED APPLICATION

The present application claims priority to French Application No. 04 50739 filed Apr. 20, 2004.

TECHNICAL FIELD

The present invention relates to a device for deflecting aerodynamic airflow for aircraft landing gear.

BACKGROUND OF THE INVENTION

A significant portion of the noise generated by an aircraft during the landing phase comes from the front landing gear, which is lowered from the aircraft, since this part is equipped with non-streamlined elements such as the landing gear leg, and since the braking and suspension devices carry angular parts that resist the airflow.

SUMMARY OF THE INVENTION

It is in particular the purpose of the present invention to reduce the noise generated by the landing gear that has been lowered during the landing phase.

To this end, the object of the present invention is an aerodynamic airflow deflecting device for the retractable landing gear in an aircraft housing comprising at least one closing element of said housing which is, when acted upon by a control device, capable of occupying a masking position with respect to the aerodynamic airflow over at least a part of the landing gear in the lowered position, thus constituting a noise reducing aerodynamic device.

Thanks to the fairing of the closing element when the latter is placed in the deflector position in front of the landing gear, such a device ensures that the flow of the aerodynamic airflow is channeled around the landing gear during the landing phase, thus eliminating the turbulence normally caused by the landing gear elements and the associated noise.

According to a first embodiment of this invention, the closing element in particular comprises at least one component, which is acted upon by a control device and which is movable between a first position for closing the housing, a second position allowing the landing gear to be lowered and a third position constituting said shielding position.

More particularly, the closing element comprises two first flaps, attached to a jig that is articulated along a first transverse axis on the aircraft structure, with each flap pivoting about first longitudinal axes that are positioned on both sides of the landing gear housing.

According to this embodiment, the jig in particular consists of a U-shaped structure with a central branch, equipped with a means for articulating the jig along said transverse axis, and two lateral branches carrying the first flaps and equipped with a means for articulating the flaps about said first longitudinal axes, with the first flaps being connected to a first end of first actuating jacks that are fixed to the jig at their second end.

In a particular embodiment, the lateral branches of the jig are equipped with side panels constituting vertical longitudinal fairings and the first actuating jacks controlling the movement of the first flaps around the lateral branches are connected to said side panels.

More particularly, the side panels connected to a first end of the second actuating jacks are attached to the aircraft structure at their second end and they control the motion of the jig around said first transverse axis.

According to a second embodiment, the deflecting device consists of a lower hood that is solidly attached to the aircraft structure through a connecting and actuating device capable of moving the lower hood between a rear, closed position of the housing, a position before the housing is opened and an inclined position which constitutes said shielding position.

According to this embodiment, the connecting device comprises a quadrilateral linkage comprising at least two longitudinal connecting arms, each equipped with a first articulation at the position of the lower hood and a second articulation on an element that is firmly attached to the aircraft structure, with the hood being displaced between said closed position of the housing and said open position of the housing by means of the rotary movement of the rocker of the connecting arms between the rear position and the front position.

More particularly, the connecting device comprises a main arm connected to the aircraft structure via an articulation that is transverse to the longitudinal axis of the aircraft and is capable of being inclined so as to place the hood in said inclined position.

The connecting arms are in particular connected via their second articulation to a main arm attached to the aircraft structure by means of an articulation that is transverse to the longitudinal axis of the aircraft, with said inclined position being attained by the combination of an inclination of the main arm and a rotation of the connecting arms to an intermediate position pulling the hood away from the aircraft structure.

According to a third embodiment, the closing element comprises at least one trap door element that is connected to the shaft of the leg of the landing gear, which is installed on the shaft which pivots about the landing gear and is mobile between the position for closing the housing and said shielding position.

According to this embodiment, the device can in particular include two trap door elements, each pivoting on one side of the shaft between a position in front of the shaft and a position behind the shaft, with the position behind the shaft allowing the housing to be closed during the reentry of the landing gear and the position in front of the shaft constituting said shielding position.

Other characteristics and advantages of this invention will be better understood on reading the following nonrestrictive description of example embodiments of this invention referring to the figures.

BRIEF DESCRIPTION OF THE DRAWINGS

FIGS. 6a and 6b are overall side and front views of a front part of an aircraft equipped with an aerodynamic airflow deflector for the landing gear according to a second embodiment of this invention;

FIG. 7 is a schematic bottom view of a detail of the design of the device of FIGS. 6a and 6b;

DETAILED DESCRIPTION OF THE INVENTION

Figure 1A:
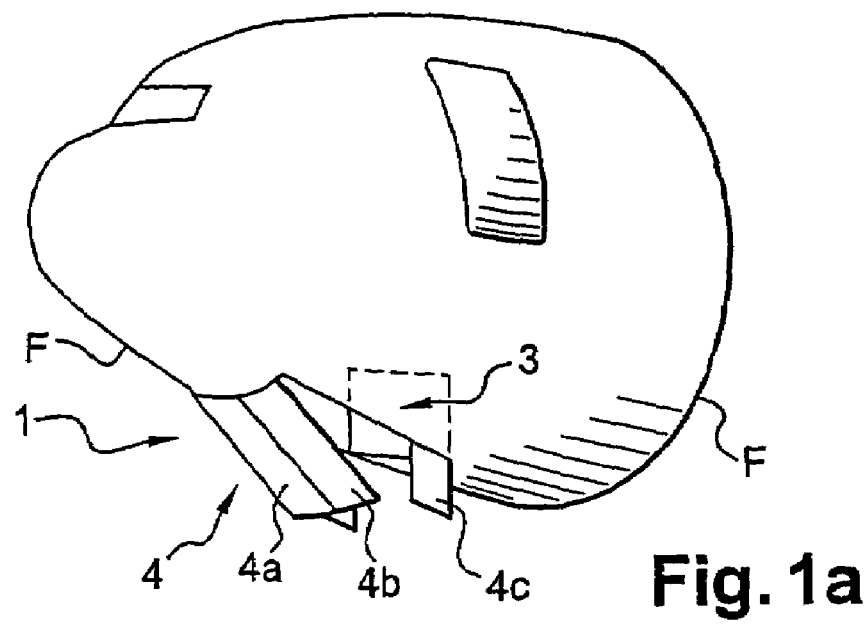
FIGS. 1a and 1b comprise general perspective and side views of the front of an aircraft equipped with an aerodynamic airflow deflector for a retractable landing gear according to an embodiment of this invention.
Figure 8A:
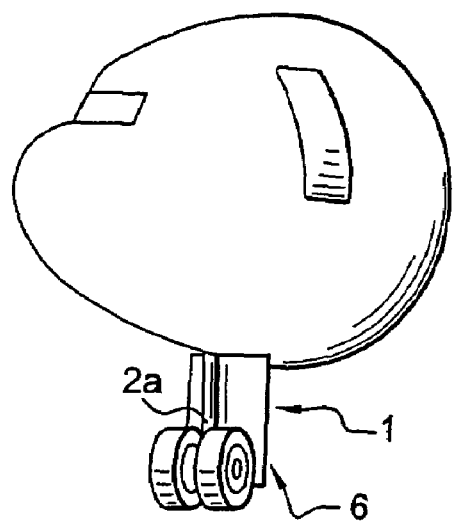
FIGS. 8a and 8b are overall perspective views of the front of an aircraft equipped with an aerodynamic airflow deflector for a retractable landing gear according to a third embodiment of this invention, with FIG. 8a showing the device in position for lowering the landing gear and FIG. 8b showing the device in position for deflecting the aerodynamic airflow.

This invention, whose three example embodiments are in particular represented by FIGS. 1a, 6a and 8a, concerns the design of an aerodynamic airflow deflecting device constituting an aerodynamic device for noise reduction by shielding at least a part of an aircraft landing gear.

It has been found that a significant fraction of the noise generated by an aircraft in the landing phase is produced by its landing gear, in particular the nose gear whose structure comprises non-aerodynamic parts, such as the leg of the landing gear and the various devices associated therewith, including elements of the suspension triangle and steering arms.

It is the aim of the present invention to place a fairing element in front of the landing gear leg, this fairing element, for reasons of simplification, safety and not unnecessarily increasing the mass of the aircraft, being combined with a closing element of the trap door type, a flap or hood participating in the closing of the housing of the aircraft landing gear.

Figure 8B:
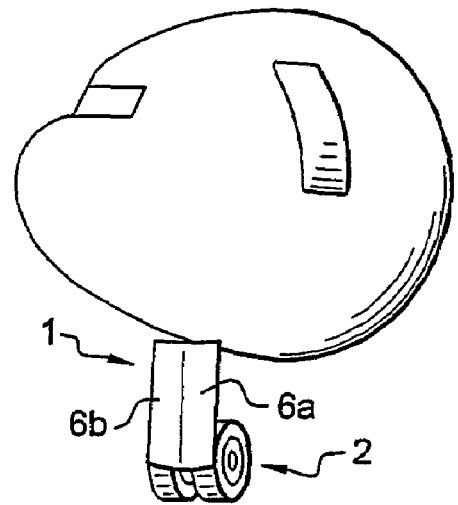

Thus, this invention mainly consists of using existing elements for closing the housing that receives the landing gear once it has retracted, so as to constitute an aerodynamic airflow deflector, and FIGS. 1a, 6a and 8b in particular describe an aerodynamic airflow deflecting device 1 for a retractable landing gear 2 in a housing 3 of an aircraft, with the device comprising at least one closing element 4, 5, 6 for said housing. The solution suggested by the invention consists of causing a substructure to pivot from the landing gear housing box to the deflector position.

Figure 1B:
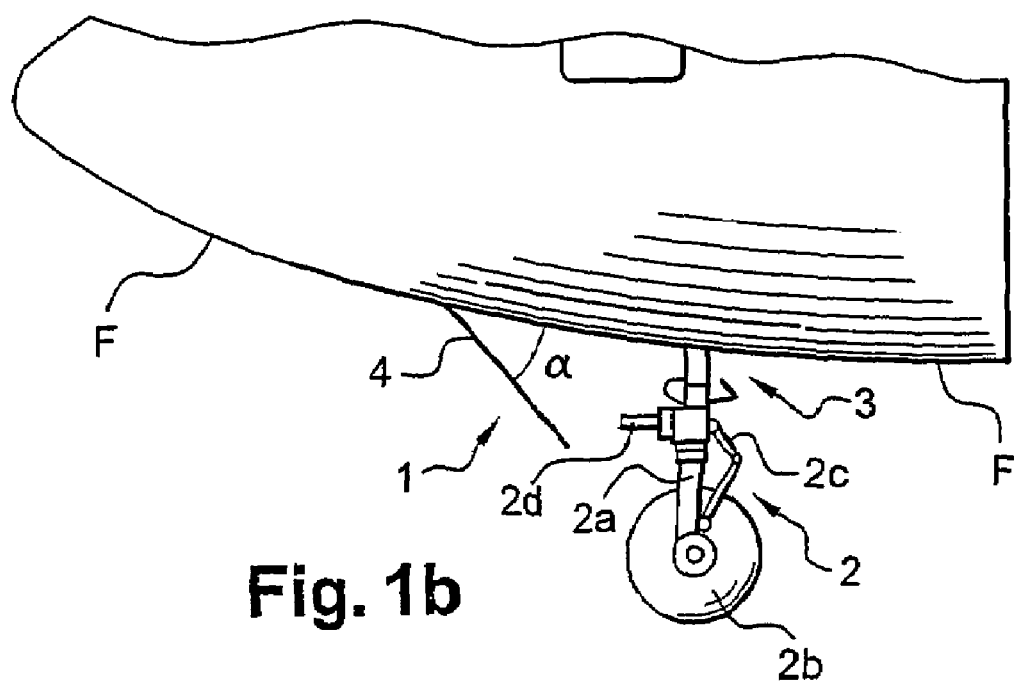
Figure 2:
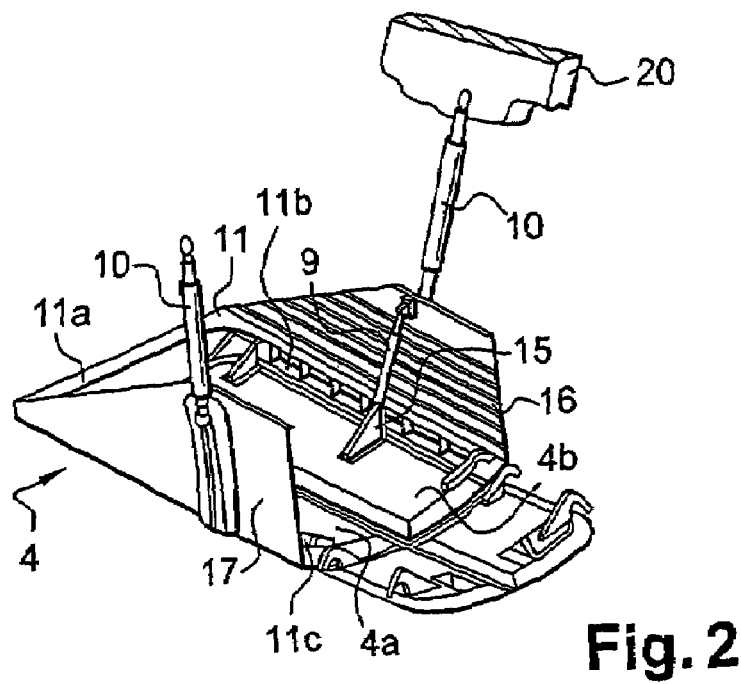
FIG. 2 is a detailed perspective view of the device of FIG. 1 in the position for closing the landing gear housing.
Figure 3:
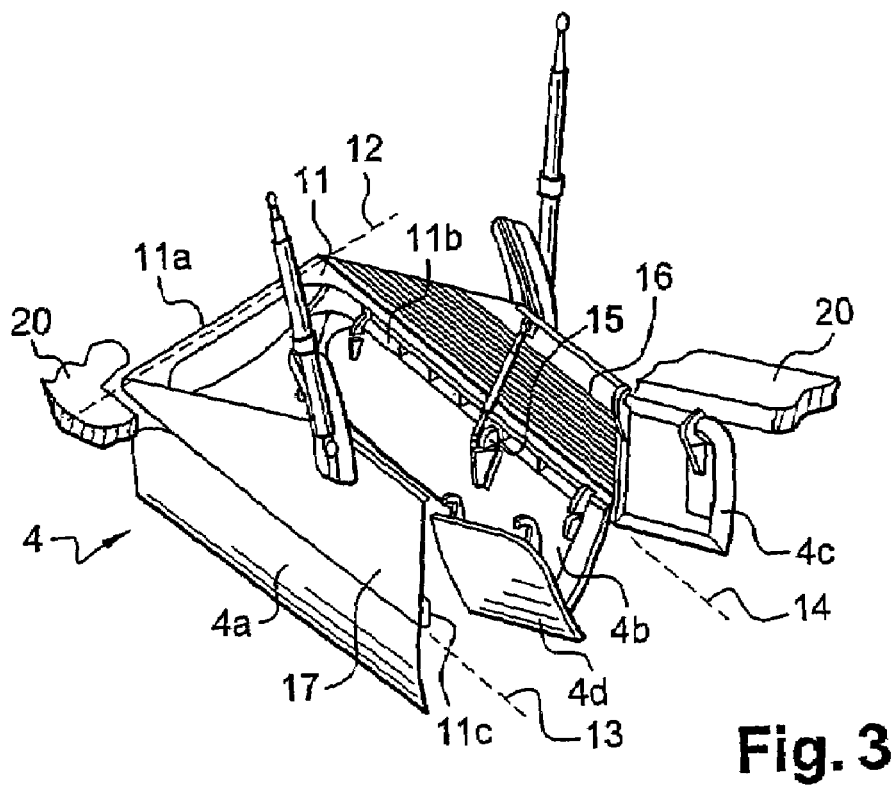
FIG. 3 depicts the device of FIG. 2 in its position for lowering the landing gear.
Figure 4:
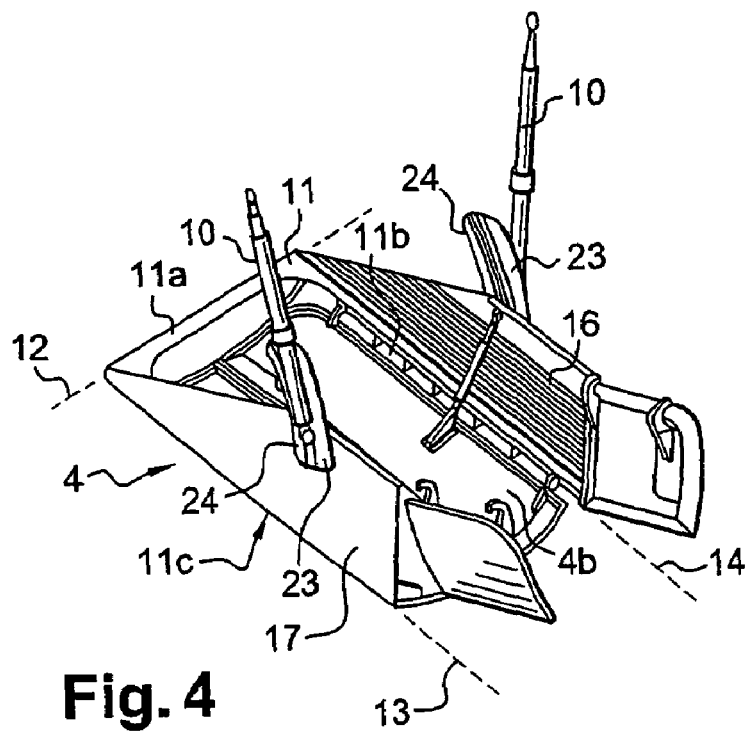
FIG. 4 depicts the device of FIG. 2 in its position for shielding the landing gear.
Figure 5:
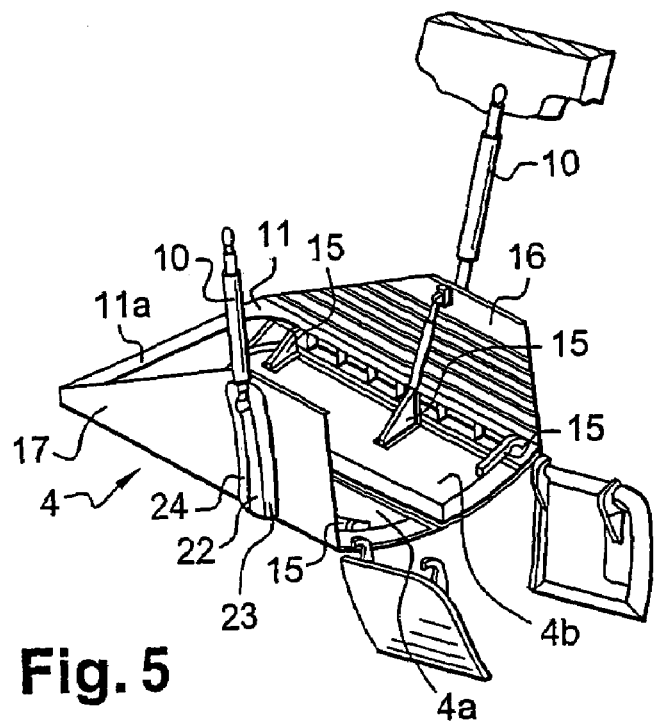
FIG. 5 depicts the device of FIG. 2 in the lowered, non-shielded position of the landing gear.

The first embodiment, depicted in FIG. 1a, represents a front view of an aircraft in perspective where the landing gear was omitted for clarity, while FIG. 1b represents a side view of the front of an aircraft with the landing gear 2.

The landing gear 2 comprises at least one wheel 2b and a leg 2a equipped with a suspension triangle 2c and a steering rod 2d. Because of their shape, these elements generate aerodynamic turbulence and thus considerable noise.

The device according to the embodiment of FIG. 1a is composed of movable trap door elements 4a, 4b, with these elements, when acted upon by a control device 9, 10 which will be described below, being capable of assuming a position that shields at least the part 2a of the landing gear 2 against the aerodynamic airflow and, thanks to the fairing, to thus constitute an aerodynamic noise reducing device.

A modern conventional aircraft generally has four flaps or trap door elements that close the housing 3 of the nose gear 2. Of these four flaps, two are forward flaps which open to let the wheels of the nose gear pass and are then closed again once the landing gear has been lowered so as to shield the part in front of the opening consisting of the housing 3 so that this opening does not generate aerodynamic drag, and two are rear flaps that are positioned on both sides of the leg of the lowered landing gear, and they remain open once the landing gear has been lowered.

According to the first embodiment of this invention, the front flaps 4a and 4b are configured so as to be capable of assuming an inclined position so as to shield a part, mainly the leg 2a, of the landing gear once the landing gear has been lowered. Thus, according to this embodiment, the aerodynamic device comprises the closing elements 4 consisting of the mobile front flaps 4a, 4b between a first position for closing the housing, a second position for lowering the landing gear and a third position, called the shielding position.

The position for lowering the landing gear is, as in a conventional system, a position in which the front flaps open before they let the landing gear exit, the shielding position being a position in which the pivoting substructure comprising a jig 11 is inclined toward the bottom at an angle of about 20° and in which the flaps 4a, 4b are in a closed position.

The kinematics of the passage from the first position to the second position can comprise an opening of the flaps, followed by an inclination of the substructure to allow the landing gear to be lowered, and then, in going from the second position to the third position, it can comprise closing the flaps, with the substructure remaining in an inclined position to fulfill the deflecting function.

The pivoting substructure of the landing gear box or housing thus comprises the front flaps 4a, 4b, with the rear flaps remaining true to their basic definition.

The movement of the flaps is accomplished by means of a control device that is capable of moving them between the three positions, with the exit position of the landing gear, for which the front flaps 4a, 4b are closed, being in particular used during the takeoff phase to decrease drag on the aircraft, whereas the shielding position is used specifically during landing to reduce the noise generated by the landing gear, with this shielding position also producing additional drag which takes part in reducing the speed of the aircraft during descent.

For this first embodiment, the control device comprises a jig 11 on which the flaps 4a and 4b are articulated along the longitudinal axes 13, 14 with respect to the aircraft, by means of articulations 15, for example of the swan neck type.

The jig comprises a U-shaped structure with a central branch 11a, which is equipped with a means for articulating the jig along the aforementioned transverse axis 12, and two lateral branches 11b, 11c each carrying a flap 4a, 4b, with these lateral branches being directed towards the back of the aircraft and along side walls of the housing 3.

The closing and opening of the flaps is accomplished by means of first jacks 9, with each of the flaps pivoting about a lateral branch 11b, 11c of the jig along said first longitudinal axes 13, 14.

The jig is itself articulated along a first transverse axis 12 of the aircraft structure 20.

Each of the first actuating jacks 9 has a first end that is connected to one of the first flaps 4a, 4b and a second end connected to the jig, and they can thus control the opening of the housing 3 so as to let the landing gear pass and to control its closing once the landing gear has exited so as to shield a significant portion of the housing 3, in particular during the takeoff phase of the aircraft, a phase for which a minimum of drag is desired.

To cause the flaps 4a, 4b to assume a shielding position, the jig is attached to a first end of the second actuating jacks 10 that are connected to the aircraft structure 20 at their second end. These second jacks 10 make it possible to incline the jig 11, for example at an angle of about 20°, while making the latter rotate about the aforesaid first transverse axis 12. In this manner, the flaps 4a, 4b are placed in an inclined position, shielding a portion of the landing gear leg 2a. This position allows the flaps 4a, 4b to perform their aerodynamic deflector function.

According to the represented example, the jig comprises lateral panels 16, 17 as vertical prolongations of the lateral branches 11b, 11c. These panels advantageously form vertical longitudinal fairings which, when the jig is in the inclined position, constitute even more streamlined lateral deflectors for the space in front of the landing gear leg, thus channeling the aerodynamic airflow so as to prevent it from being engulfed in the landing gear housing, which further decreases the aerodynamic noise from this part of the aircraft.

Moreover, these lateral panels make it possible to more easily connect the first actuating jacks 9 to the jig in order to provide them a wider path for moving the first flaps 4a, 4b around the lateral branches 11b, 11c.

To guide the jig in its rotational movement about the transverse axis 12, the panels of the housing 3 carry guide rails 23, 24 defining a channel 22 in which the lower end of the jacks 10 slides. These guide rails have a circular arc profile that is coincident with the perimeter of a circle centered on the transverse axis 12.

The example embodiment described by FIGS. 6a, 6b and 7 is based on a closing element consisting of a lower hood 5 that is articulated on the structure 20 of the aircraft through a connecting and actuating device 7, 8 for purposes of moving the lower hood 5 between a rear position for closing the housing 3, a position prior to opening the housing 3, and an inclined position corresponding to the shielding position. According to this embodiment, the lower hood constitutes a trap door which covers a major part of housing 3 of the landing gear 2 and which is displaced as a single block, from the back to the front of the aircraft, so as to cause the housing to open and to allow the landing gear to exit.

When it is in the position for closing the housing 3, this hood, in the form of a fairing, constitutes a lower part of the fuselage.

The connecting device 7, 8 comprises an articulated quadrilateral linkage comprising at least two longitudinal connecting arms 7, each equipped with a first articulation 7a at the position of the lower hood 5 and with a second articulation 7b on an element attached to the aircraft structure 20. An actuating device, such as an electric motor 25, connected to the axis of one of the connecting arms 7 commands the rotation of the connecting arms so as to move the hood between said position for closing the housing 3 and said position for opening the housing 3 via the rotary motion of a rocker of the connecting arms 7, which moves the hood 5 between a rear position and a front position.

This connecting device, shown in side view in FIG. 7, can be single or double depending on the effort necessary to move the hood, with a double device comprising two laterally spaced parallel main arms 8, each accepting a pair of connecting arms 7.

To place the hood in the inclined position enabling it to perform its deflecting function, the connecting device comprises a main arm 8 connected to the structure 20 of the aircraft through a third articulation 21, transverse to the longitudinal axis of the aircraft. The main arm is a longitudinal arm which can be inclined by means of a rotation about the transverse axis of a third articulation 21 so as to place the hood 5 in the inclined position. The spacing of the hood with respect to the aircraft fuselage can be increased by combining the inclination of the main arm with a rotation of the connecting arms 7 to an intermediate position between said rear position and said front position.

According to this embodiment, the hood 5 can be spaced to a greater or lesser degree in order to increase or to reduce the exposed surface area of the landing gear 2. This can in particular make it possible not to cause too much drag at the beginning of the approach phase of the landing, with the landing gear lowered while holding the hood close to its fully open position, and then, near the ground, deploying the hood to the position for maximum shielding of the landing gear and maximally decreasing the aerodynamic noise generated by the latter.

Figure 9:
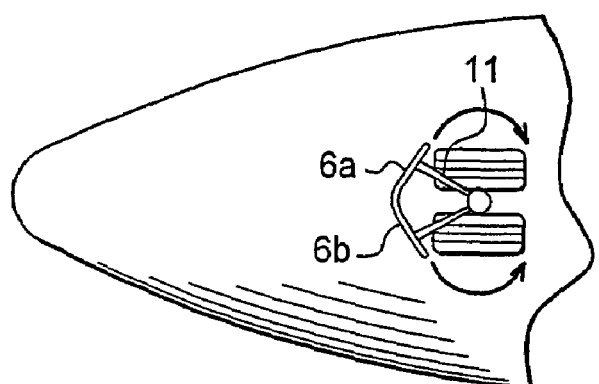
FIG. 9 is a top view of the device of FIGS. 8a and 8b.

A third example embodiment of the device of this invention is described by FIGS. 8a, 8b and 9. According to this example embodiment, the device is always based on the use of at least one closing element 6 of the housing as a deflector, in this case consisting of elements of the rear trap door 6a, 6b that are attached to the shaft 2a of the landing gear leg 2 and are mounted so as to pivot about the shaft.

The rear trap door elements 6a, 6b are rotationally displaced about the shaft between:

a position in which they are behind the leg of the landing gear 2, with this position being the position which allows reentry of the landing gear into the housing 3 and closure of the housing by the rear trap door elements 6a, 6b, and, a position in which they are in front of the leg of the landing gear and in which they fulfill their function as deflectors.

Thus, in order to place these elements in the shielding position, each of the rear trap door elements 6a, 6b pivot from one side of the shaft around the shaft 2a of the landing gear 2, between a position in front of the shaft 2a and a position behind the shaft 2a.

This embodiment has the advantage of simplifying the control device of the flaps 6a, 6b, but on the other hand, it causes considerable drag when the flaps are in the rear position so as to allow retraction of the landing gear.

In its various embodiments, the device of this invention can of course be connected to a computerized control system which controls the position of the trap door elements automatically according to the stages of the aircraft's flight, particularly with the intent to not overload the pilot and to automatically place the trap door elements in the deflecting position during the approach and the landing, to then mask them for rolling and in the takeoff phase in the case of the first two example embodiments described above.

This invention is not limited to the examples that are described, and in particular other forms of trap door elements are able to fulfill the deflecting function, with the hood device being combinable with rear trap doors in order to reduce its bulk.

The invention claimed is:

1. An aerodynamic airflow deflecting device for a landing gear that is retractable into and extendable from a housing of an aircraft, the aerodynamic airflow deflecting device comprising:

a closing assembly operably coupled to the housing, the closing assembly being shiftable, by a control device, between a first position such that the housing is closed, a second position to allow the landing gear to extend from the housing, and a third position opposing an aerodynamic airflow such that in the third position, the closing assembly shields at least a part of the landing gear when the landing gear is in an extended, landing position, and wherein the closing assembly comprises two flaps operably coupled to a jig articulatable about a first transverse axis of the aircraft, wherein the first flap is pivotable about a first longitudinal axis located on a first side of the housing, and the second flap is pivotable about a second longitudinal axis located on a second side of the housing, and wherein the two flaps are inclined in front of the lowered landing gear when the closing assembly is in the third position, and wherein the articulated jig comprises a U-shaped structure with a central branch and two lateral branches, the first flap being coupled to one of the two lateral branches, and the second flap being coupled to the other lateral branch, wherein each lateral branch of the two lateral branches of the jig comprises a lateral panel forming a vertical longitudinal fairing.

2. The device according to claim 1, wherein the central branch of the jig is equipped with means for articulating the jig about the first transverse axis, and wherein the two lateral branches are each equipped with means for articulating the flaps about the first and second longitudinal axes.

3. The device according to claim 1, further comprising a first pair of actuating jacks, each actuating jack of the first pair being associated with one of the two flaps, a first end of each actuating jack of the first pair being operably coupled to the associated flap and a second end of each actuating jack of the first pair being operably coupled to the jig.

4. The device according to claim 3, wherein each actuating jack of the first pair of actuating jacks is operably coupled to one of the lateral panels, and wherein each actuating jack of the first pair of actuating jacks is adapted to direct the motion of the associated flap about the corresponding lateral branch.

5. The device according to claim 4, further comprising a second pair of actuating jacks, each actuating jack of the second pair being associated with one of the two lateral panels, a first end of each actuating jack of the second pair being operably coupled to the associated lateral panel and a second end of each actuating jack of the second pair being operably coupled to the aircraft structure, wherein each actuating jack of the second pair of actuating jacks is adapted to direct the movement of the jig about the first transverse axis.

* * * * *

UNITED STATES PATENT AND TRADEMARK OFFICE
CERTIFICATE OF CORRECTION

PATENT NO.       : 7,651,053 B2                                   Page 1 of 1
APPLICATION NO.  : 11/110174
DATED            : January 26, 2010
INVENTOR(S)      : Frederic Fort It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Twenty-third Day of November, 2010

David J. Kappos
*Director of the United States Patent and Trademark Office*